United States Patent
Storz

(10) Patent No.: US 12,304,994 B2
(45) Date of Patent: May 20, 2025

(54) ACCELERATOR COMPOSITION FOR THE CURE OF EPOXY RESINS WITH AROMATIC AMINES

(71) Applicant: Huntsman Advanced Materials Licensing (Switzerland) GmbH, Basel (CH)

(72) Inventor: Christof Storz, Basel (CH)

(73) Assignee: HUNTSMAN ADVANCED MATERIALS LICENSING (Switzerland) GmbH

(*) Notice: Subject to any disclaimer, the term of this patent is extended or adjusted under 35 U.S.C. 154(b) by 0 days.

(21) Appl. No.: 17/044,869

(22) PCT Filed: Mar. 21, 2019

(86) PCT No.: PCT/EP2019/057053
§ 371 (c)(1),
(2) Date: Oct. 2, 2020

(87) PCT Pub. No.: WO2019/192847
PCT Pub. Date: Oct. 10, 2019

(65) Prior Publication Data
US 2021/0130539 A1 May 6, 2021

(30) Foreign Application Priority Data

Apr. 4, 2018 (EP) .................... 18165724

(51) Int. Cl.
*C08G 59/72* (2006.01)
*C08G 59/50* (2006.01)
*C08G 59/68* (2006.01)

(52) U.S. Cl.
CPC ......... *C08G 59/72* (2013.01); *C08G 59/5033* (2013.01); *C08G 59/685* (2013.01)

(58) Field of Classification Search
CPC ... C08G 59/72; C08G 59/5033; C08G 59/685
See application file for complete search history.

(56) References Cited

U.S. PATENT DOCUMENTS

| | | | |
|---|---|---|---|
| 2,909,494 A | 10/1959 | Parry et al. | |
| 3,201,360 A | 8/1965 | Proops et al. | |
| 3,438,849 A * | 4/1969 | Isack ...................... | C08G 59/12 525/481 |
| 3,577,386 A * | 5/1971 | Maier ...................... | C08L 63/00 528/92 |
| 3,723,569 A * | 3/1973 | Hoeschele ............ | C08L 67/025 525/438 |
| 3,738,862 A * | 6/1973 | Klarquist et al. .... | C08G 59/688 427/386 |
| 4,698,408 A * | 10/1987 | Goel ...................... | C08L 63/00 528/53 |
| 4,766,196 A | 8/1988 | Goel et al. | |
| 5,051,492 A * | 9/1991 | Andre .................... | C08G 59/62 528/361 |
| 2001/0018122 A1 | 8/2001 | Yuyama et al. | |
| 2015/0353675 A1* | 12/2015 | Duquenne ............. | C08G 59/68 524/611 |
| 2017/0247502 A1 | 8/2017 | Qian et al. | |
| 2017/0247503 A1* | 8/2017 | Qian .................. | C08G 59/5033 |

FOREIGN PATENT DOCUMENTS

| | | |
|---|---|---|
| CN | 103228694 A | 7/2013 |
| GB | 989375 A | 4/1965 |
| GB | 1235413 A | 6/1971 |
| JP | 44-026741 B1 | 11/1969 |
| JP | 47-14148 A | 4/1972 |
| JP | 2017-535652 A | 11/2017 |
| SU | 1525174 A1 | 11/1989 |
| TW | 201542638 A | 11/2015 |
| WO | 2012047420 A2 | 4/2012 |
| WO | 2016081546 A | 5/2016 |

OTHER PUBLICATIONS

"Boron Trifluoride or its derivatives—as a catalyst for your process" referenced in Singapore office action dated Aug. 27, 2021.
Lee, H. and Neville, K. "Handbook of Epoxy Resins", McGraw-Hill Book Company, New York, 1967, Chapter 2, pp. 257-307.
Chinese Office Action issued Jan. 19, 2023, in corresponding Chinese Application No. 201980023232.X (English translation enclosed herewith).
Japanese Office Action issued Feb. 8, 2023, in corresponding Japanese Application No. 2020-554234 (English translation enclosed herewith).

* cited by examiner

Primary Examiner — Megan McCulley

(57) ABSTRACT

The disclosure relates to an accelerator composition for the cure of epoxy resins with aromatic amines comprising: (a) a metal complex with carboxylate ligands; and (b) a boron trifluoride amine complex or a boron trifluoride phenol complex. The disclosure also relates to a curing composition for the cure of epoxy resin comprising: (i) an aromatic amine as curing agent; and (ii) the above accelerator composition or, alternatively, a mixture of (1) a metal complex with carboxylate ligands and (2) neat boron trifluoride or boron trifluoride etherate for in-situ formation of a boron trifluoride amine complex with the aromatic amine. Additionally, the disclosure relates to the use of such compositions and to a cured resin product obtainable from the use of such compositions.

7 Claims, No Drawings

ACCELERATOR COMPOSITION FOR THE CURE OF EPOXY RESINS WITH AROMATIC AMINES

CROSS-REFERENCE TO RELATED APPLICATIONS

This application is the National Stage application filed under 35 U.S.C. § 371 of International Application No. PCT/EP2019/057053 filed Mar. 21, 2019 which designated the United States and which claims priority to European App. Serial No. 18165724.8 filed Apr. 4, 2018. The noted applications are incorporated herein by reference in their entirety.

TECHNICAL FIELD

The present disclosure relates to an accelerator composition for the cure of epoxy resins with aromatic amines.

BACKGROUND

Amines are widely used for curing or hardening epoxy resins. In most cases, aliphatic amines are used which result in curing times in the range of seconds to minutes. However, in specific situations, the use of aromatic amines may be preferred. However, the cure of epoxy resins with aromatic amines is very slow compared to aliphatic amines. Without any accelerator, the cure of epoxy resins with aromatic amines at temperatures of, for example, 120° C. is in the range of hours.

Therefore, accelerators or catalysts have been developed to accelerate the cure of epoxy resins with aromatic amines.

WO 2016/081546 A1 discloses an accelerator composition for the cure of epoxy resins comprising a transition metal complex and a salt.

U.S. Pat. No. 2,909,494 describes the use of boron trifluoride complexes and U.S. Pat. No. 3,201,360 describes the use of metal carboxylates for that purpose. However, even with these catalysts, usual curing times are in the range of 30 to 60 minutes.

OBJECT OF THE DISCLOSURE

It is an object of the disclosure to develop a new catalyst for accelerating the cure rate of epoxy resins with aromatic amines resulting in substantially faster curing times.

DISCLOSURE

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference to the extent that they do not contradict the instant disclosure.

All of the compositions and/or methods disclosed herein can be made and executed without undue experimentation in light of the present disclosure. While the compositions and methods of the present disclosure have been described in terms of preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCC, CBBAAA, CABBB, and so forth. The skilled artisan will understand that typically there is no limit on the number of items or terms in any combination, unless otherwise apparent from the context. In the same light, the terms "or combinations thereof" and "and combinations thereof" when used with the phrases "selected from" or "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

As used herein, the phrase "metal complex with carboxylate ligands" means a complex comprising (i) at least one metal cation and (ii) carboxylate ligands bound to the metal cation. Carboxylate ligands, as used herein, are carboxylate ions bound to the metal cation, and which are derived from organic acids such as octoates, neodecanoates, and naphthenates. The phrase "active metal carboxylates" is used interchangeably herein with respect to the phrase "metal complex with carboxylate ligands". For example, the expression "zinc carboxylate" refers to a metal complex with carboxylate ligands, wherein zinc is the metal cation. A non-limiting example of a zinc carboxylate is zinc octoate.

The object is solved by using an accelerator composition to accelerate the cure of epoxy resins with aromatic amines, the accelerator composition comprising
(a) a metal complex with carboxylate ligands; and
(b) a boron trifluoride amine complex or a boron trifluoride phenol complex.

Preferably, the metal cation of the metal complex with carboxylate ligands is selected from zinc, tin and chromium.

Preferably, the carboxylate ligands are selected from octoates, neodecanoates and naphthenates.

In a preferred embodiment, the amine of the boron trifluoride amine complex is selected from ethylamine, monoisopropylamine, N-methylcyclohexylamine, piperidine and 2,4-dimethylaniline.

In a preferred embodiment, the phenol of the boron trifluoride phenol complex is selected from phenol, 2-methylphenol, 3-methylphenol and 4-methylphenol.

In a preferred embodiment, the stoichiometric ratio of (a):(b) is in the range from 1:50 to 50:1, wherein "(a)" refers to the metal complex with carboxylate ligands and "(b)" refers to the boron trifluoride amine complex or a boron trifluoride phenol complex.

In a more preferred embodiment, the stoichiometric ratio of (a):(b) is about 1:10 to 10:1, most preferably 1:3 to 3:1, wherein again "(a)" refers to the metal complex with carboxylate ligands and "(b)" refers to the boron trifluoride amine complex or a boron trifluoride phenol complex.

The present disclosure is also related to a curing composition for the cure of epoxy resin comprising
(i) an aromatic amine as curing agent; and
(ii) an accelerator composition as disclosed herein or, alternatively, a mixture of (1) a metal complex with carboxylate ligands and (2) neat boron trifluoride or boron trifluoride etherate for in-situ formation of a boron trifluoride amine complex with the aromatic amine.

For the alternative of component (ii), a sufficient amount of neat boron trifluoride or boron trifluoride etherate is mixed with the aromatic amine such that a stoichiometric ratio of from 1:50 to 50:1, preferably 1:10 to 10:1, more preferably 1:3 to 3:1 of the metal complex with carboxylate ligands to boron trifluoride amine complex or boron trifluoride phenol complex is achieved.

The present disclosure is further related to a curable epoxy composition comprising:
(i) an epoxy resin;
(ii) an aromatic amine as a curing agent; and
(iii) an accelerator composition as disclosed herein or, alternatively, a mixture of (1) a metal complex with carboxylate ligands and (2) neat boron trifluoride or boron trifluoride etherate for in-situ formation of a boron trifluoride amine complex with the aromatic amine.

In one embodiment, the aromatic amine is selected from diethyltoluene diamine, 4,4'-methylenebis(2-ethylaniline), 4,4'-diaminodiphenylmethane, 4,4'-diaminodiphenyl-sulfone, 3,3'-diaminophenylsulfone, 1,2-, 1,3- and 1,4-benzenediamine, bis(4-aminophenyl)methane, 1,3-xylenediamine, 1,2-diamino-3,5-dimethylbenzene, 4,4'-diamino-3,3'-dimethylbiphenyl, 4,4'-methylene-bis(2,6-dimethylaniline), 1,3-bis(m-aminophenoxy)benzene, 9,9-bis(4-aminophenyl)fluorene, 3,3'-diaminodiphenylsulfone, 4,4'-diaminodiphenylsulfide, 1,4-bis(p-aminophenoxy)benzene, 1,3-propanediol-bis(4-aminobenzoate and mixtures thereof. However, any other aromatic amine is suitable.

In one embodiment, the amount of the accelerator composition added with respect to the epoxy resin is in the range from 0.01 to 15 parts of accelerator composition per 100 parts of epoxy resin, most preferably from 0.1 to 5 parts of accelerator composition per 100 parts of epoxy resin.

In another embodiment, the curable epoxy composition can further comprise one or more additional additives, including, for example, toughening agents, flow modifiers, or adhesion modifiers.

In another aspect, the present disclosure is directed to a method of preparing the curable epoxy composition comprising mixing (i) an epoxy resin; (ii) an aromatic amine; and (iii) the accelerator composition as described herein or, alternatively, a mixture of (1) a metal complex with carboxylate ligands and (2) neat boron trifluoride or boron trifluoride etherate for in-situ formation of a boron trifluoride amine complex with the aromatic amine.

The present disclosure is also directed to a method of preparing the curing composition comprising mixing (i) an aromatic amine; and (ii) the accelerator composition as described herein or, alternatively, a mixture of (1) a metal complex with carboxylate ligands and (2) neat boron trifluoride or boron trifluoride etherate for in-situ formation of a boron trifluoride amine complex with the aromatic amine.

The present disclosure is further directed to a method of producing a cured resin product comprising a step of curing the curable epoxy composition for a sufficient time, temperature and pressure to substantially cure the curable epoxy composition.

The present disclosure is also directed to a cured resin product obtained by the method described herein of curing the curable epoxy composition for a time and temperature sufficient to substantially cure the curable epoxy composition The present disclosure is also related to the use of the accelerator composition disclosed herein for curing an epoxy resin with an aromatic amine or of a curing composition as disclosed herein for curing an epoxy resin.

In one embodiment of the use according to the present disclosure, the aromatic amine is selected from diethyltoluene diamine, 4,4'-methylenebis(2-ethylaniline), 4,4'-diaminodiphenylmethane, 4,4'-diaminodiphenyl-sulfone, 3,3'-diaminophenylsulfone, 1,2-, 1,3- and 1,4-benzenediamine, bis(4-aminophenyl)methane, 1,3-xylenediamine, 1,2-diamino-3,5-dimethylbenzene, 4,4'-diamino-3,3'-dimethylbiphenyl, 4,4'-methylene-bis(2,6-dimethylaniline), 1,3-bis(m-aminophenoxy)benzene, 9,9-bis(4-aminophenyl)fluorene, 3,3'-diaminodiphenylsulfone, 4,4'-diaminodiphenylsulfide, 1,4-bis(p-aminophenoxy)benzene, 1,3-propanediol-bis(4-aminobenzoate and mixtures thereof. However, any other aromatic amine is suitable.

Preferably, the amount of the accelerator composition added in respect to the epoxy resin is in the range from 0.01 to 15 parts per 100 parts of resin, most preferably from 0.1 to 5 parts per 100 parts of resin.

Finally, the present disclosure is related to a cured resin product obtainable from the use as disclosed herein.

Surprisingly, a mixture of the two known catalysts for accelerating the cure of epoxy resins with aromatic amines leads to substantially faster curing times compared to the curing times expected from combining the single catalysts, i.e. to a distinct synergistic effect.

These novel accelerator compositions would make aromatic amines, especially diethyl toluene diamine, more attractive for industrial applications where the demand for short cure cycle times, to become more profitable, is growing vastly over the last years.

The novel accelerator compositions were tested on the cure of a standard bisphenol-A-diglycidylether (BADGE) with the aromatic curing agent diethyltoluene diamine (DETDA). Accelerator compositions consisting of a number of metal complexes with carboxylate ligands and boron trifluoride complexes in varying stoichiometric and weight ratios were tested.

The accelerator or curing compositions as disclosed herein may be used with any appropriate epoxy resin. The epoxy resins may be monomeric, oligomeric or polymeric compounds containing at least two epoxide groups. Moreover, the epoxy resin may be aliphatic, cycloaliphatic, aromatic, cyclic, heterocyclic or mixtures thereof. Also, the epoxy resin may be saturated or unsaturated, substituted or unsubstituted. A list of epoxy resins useful for the cure with the accelerator or curing compositions of the present disclosure can be found in Lee, H. and Neville, K. "Handbook of Epoxy Resins", McGraw-Hill Book Company, New York, 1967, Chapter 2, pages 257-307.

A few non-limiting examples of useful epoxy resins are aliphatic epoxides prepared from the reaction of epihalohydrins and polyglycols, such as trimethylpropane epoxide; diglycidyl-1,2-cyclohexane dicarboxylate, bisphenol-A-diglycidylether, bisphenol-F-diglycidylether; resorcinol diglycidylether; triglycidylethers of para-aminophenols, halogen-containing epoxy resins, such as diglycidylether of tetrabromobisphenol-A; epoxidized phenol novolac, epoxidized bisehenol-A novolac, and oxazolidone-modified epoxy resins; epoxy-terminated polyoxazolidone; and mixtures thereof.

The aromatic amine may be any such compound suitable for curing (or hardening) epoxy resins. Non-limiting examples comprise diethyltoluene diamine (DETDA), 4,4'-methylenebis(2-ethylaniline) (Diethyl DDM), 4,4'-diaminodiphenylmethane (DDM) and 4,4'-diaminodiphenylsulfone (DDS).

The accelerator compositions as disclosed herein show an unexpected synergistic acceleration effect on the cure. The new accelerator compositions cure up to about three times faster compared to known systems. Additionally, the glass transition temperature (Tg) build up after isothermal cure at 130° C. is much faster (around 30-50° C. higher for 10 min at 130° C.) which is an important feature leading to a faster demoldability and therefore to short cure cycles.

Details can be seen from the following examples.

EXAMPLES

A standard BADGE (bisphenol A diglycidyl ether) resin (Araldite® GY 250 available from Huntsman Corp. or an affiliate thereof) was cured isothermally at 130° C. followed by Dynamic Scanning calorimetry (DSC) with diethyltoluene diamine (Lonzacure® DETDA 80 from Lonza) in an equimolar ratio (100 parts by weight Araldite® GY 250, 24.1 parts by weight Lonzacure® DETDA 80). Zinc octoate (Alfa Aesar), boron trifluoride ethylamine complex (Sigma Aldrich) and various mixtures according to the present disclosure were investigated as the accelerator species.

TABLE 1

Screening of synergistic acceleration effect of metal carboxylates in combination with boron trifluoride ethylamine complex for the cure of 100 phr Araldite ® GY 250 with 24.1 phr Lonzacure ® DETDA 80 (0.135 mol) followed by DSC (catalyst loading 0.016 mol, with a molar ratio metal carboxylate/boron trifluoride ethylamine complex of 0.75).

| Catalyst | Time to 95% conversion @130° C. (min) | Tg onset/Tg midpoint after 60 min @ 130° C. (° C.) | Tg onset/Tg midpoint after full cure (° C.) |
|---|---|---|---|
| No | >60 | 63/70 | 132/138 |
| BF$_3$-ethylamine | 26.2 | 136/141 | 175/183 |
| Zinc octoate | 26.9 | 118/128 | 163/173 |
| Zinc octoate/BF$_3$-ethylamine (inventive example) | 11.7 | 143/146 | 168/174 |
| Zinc neodecanoate | 25.1 | 120/128 | 159/165 |
| Zinc neodecanoate/BF$_3$-ethylamine (inventive example) | 15.0 | 140/145 | 165/171 |
| Chromium octoate | 4.5 | 106/116 | 97/118 |
| Chromium octoate/BF$_3$-ethylamine (inventive example) | 1.6 | 139/146 | 155/162 |
| Tin octoate | 13.0 | 143/147 | 157/165 |
| Tin octoate/BF$_3$-ethylamine (inventive example) | 8.2 | 152/157 | 162/171 |
| Tin neodecanoate | 10.1 | 139/144 | 146/157 |
| Tin neodecanoate/BF$_3$-ethylamine (inventive example) | 7.0 | 149/154 | 158/166 |

Mixtures of zinc, tin and chromium carboxylates with boron trifluoride ethylamine complex show a significant synergistic catalyst effect on cure speed and Tg build-up.

TABLE 2

Screening of synergistic acceleration effect on variation of molar ratio and catalyst loading of tin octoate with boron trifluoride ethylamine complex followed by DSC (System: 100 phr Araldite ® GY 250, 24.1 phr Lonzacure ® DETDA 80 (0.135 mol)).

| Catalyst loading (mol) | Molar ratio tin octoate/BF$_3$-ethylamine (inventive example) | Time to 95% conversion @130° C. (min) | Tg onset/Tg midpoint after 60 min @ 130° C. (° C.) | Tg onset/Tg midpoint after full cure (° C.) |
|---|---|---|---|---|
| 0.0155 | 0.75 | 8.2 | 152/157 | 162/171 |
| 0.0154 | 0.45 | 8.0 | 154/158 | 162/172 |

TABLE 2-continued

Screening of synergistic acceleration effect on variation of molar ratio and catalyst loading of tin octoate with boron trifluoride ethylamine complex followed by DSC (System: 100 phr Araldite ® GY 250, 24.1 phr Lonzacure ® DETDA 80 (0.135 mol)).

| Catalyst loading (mol) | Molar ratio tin octoate/ $BF_3$-ethylamine (inventive example) | Time to 95% conversion @130° C. (min) | Tg onset/ Tg midpoint after 60 min @ 130° C. (° C.) | Tg onset/ Tg midpoint after full cure (° C.) |
|---|---|---|---|---|
| 0.0154 | 1.18 | 5.8 | 151/155 | 154/162 |
| 0.0078 | 0.75 | 9.9 | 154/158 | 173/179 |
| 0.0233 | 0.75 | 8.1 | 143/148 | 150/160 |
| 0.0068 | 0.54 | 11.4 | 153/156 | 175/179 |
| 0.0046 | 1.08 | 12.5 | 145/148 | 175/180 |
| 0.0058 | 1.61 | 12.0 | 153/156 | 173/180 |

Increasing tin octoate or catalyst loading leads to increase in cure speed. A too high tin octoate or catalyst loading may lead to a lower final Tg. As a result there is an optimum catalyst loading and molar ratio of tin octoate with boron trifluoride ethylamine complex, namely 0.005-0.015 mol with a molar ratio of 0.5-2.0 for having a fast cure speed in combination with a high final Tg. However, other formulations may be more interesting, if mainly speed of the reaction is of importance.

TABLE 3

Screening of synergistic catalytic active boron trifluoride complexes with tin octoate at a catalyst loading of 0.016 mol and a molar ratio of tin octoate to boron trifluoride complexes of 0.75 followed by DSC (System: 100 phr Araldite ® GY 250, 24.1 phr Lonzacure ® DETDA 80 (0.135 mol)).

| Catalyst | Time to 95% conversion @130° C. (min) | Tg onset/ Tg midpoint after 60 min @ 130° C. (° C.) | Tg onset/ Tg midpoint after full cure (° C.) |
|---|---|---|---|
| no | >60 | 63/70 | 132/138 |
| Tin octoate | 13.0 | 143/147 | 157/165 |
| Tin octoate/$BF_3$-ethylamine (inventive example) | 8.2 | 152/157 | 162/171 |
| $BF_3$-ethylamine | 26.2 | 136/141 | 175/183 |
| Tin octoate/$BF_3$-phenol (inventive example) | 5.5 | 153/159 | 160/170 |
| $BF_3$-phenol | 18.2 | 147/152 | 163/172 |
| Tin octoate/$BF_3$—N-methylcyclohexylamine (inventive example) | 9.2 | 149/153 | 159/166 |
| $BF_3$—N-methylcyclohexylamine | 31.0 | 118/126 | 163/170 |
| Tin octoate/$BF_3$-2,4-dimethylaniline in butanediol (inventive example) | 5.5 | 142/148 | 143/153 |
| $BF_3$-2,4-dimethylaniline in butanediol | 21.8 | 128/135 | 137/150 |
| Tin octoate/$BF_3$-piperidine (inventive example) | 9.0 | 149/153 | 165/170 |
| $BF_3$-piperidine | 29.7 | 114/124 | 159/163 |
| Tin octoate/$BF_3$-monoisopropylamine (inventive example) | 8.1 | 151/155 | 157/164 |
| $BF_3$-monoisopropylamine | 26.0 | 137/142 | 170/177 |

All mixtures of boron trifluoride complexes with tin octoate show a significant synergistic catalyst effect on cure speed and Tg build-up.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A curable epoxy composition comprising
    a) a accelerator composition comprising a metal complex with carboxylate ligands and a boron trifluoride phenol complex;
    (b) an epoxy resin; and
    (c) an aromatic amine curing agent,
wherein the amount of the accelerator composition added with respect to the epoxy resin is in the range from 0.01 to 15 parts of accelerator composition per 100 parts of epoxy resin.

2. The curable epoxy composition of claim 1, wherein the metal cation of the metal complex with carboxylate ligands is selected from zinc, tin and chromium.

3. The curable epoxy composition of claim 1, wherein the carboxylate ligands are selected from octoates, neodecanoates and naphthenates.

4. The curable epoxy composition of claim 1, wherein the phenol of the boron trifluoride phenol complex is selected from phenol, 2-methylphenol, 3-methylphenol and 4-methylphenol.

5. A method of producing a cured resin product comprising a step of curing the curable epoxy composition of claim 1 for a time and temperature sufficient to substantially cure the curable epoxy composition.

6. A curable resin product obtained by the method of claim 5.

7. The curable epoxy composition of claim 1, wherein the aromatic amine is selected from diethyltoluene diamine, 4,4'-methylenebis(2-ethylaniline), 4,4'-diaminodiphenylmethane, 4,4'-diaminodiphenylsulfone, 3,3'-diaminophenylsulfone, 1,2-, 1,3- and 1,4-benzenediamine, bis(4-aminophenyl)methane, 1,3-xylenediamine, 1,2-diamino-3,5-dimethylbenzene, 4,4'-diamino-3,3'-dimethylbiphenyl, 4,4'-methylene-bis(2,6-dimethylaniline), 1,3-bis(m-aminophenoxy)benzene, 9,9-bis(4-aminophenyl)fluorene, 3,3'-diaminodiphenylsulfone, 4,4'-diaminodiphenylsulfide, 1,4-bis(p-aminophenoxy)benzene, 1,3-propanediol-bis(4-aminobenzoate and mixtures thereof.

* * * * *